Nov. 20, 1951 H. COHEN 2,575,584
APPARATUS FOR EXTRACTING JUICES FROM CITRUS FRUITS AND THE LIKE
Filed Jan. 7, 1950 5 Sheets-Sheet 2
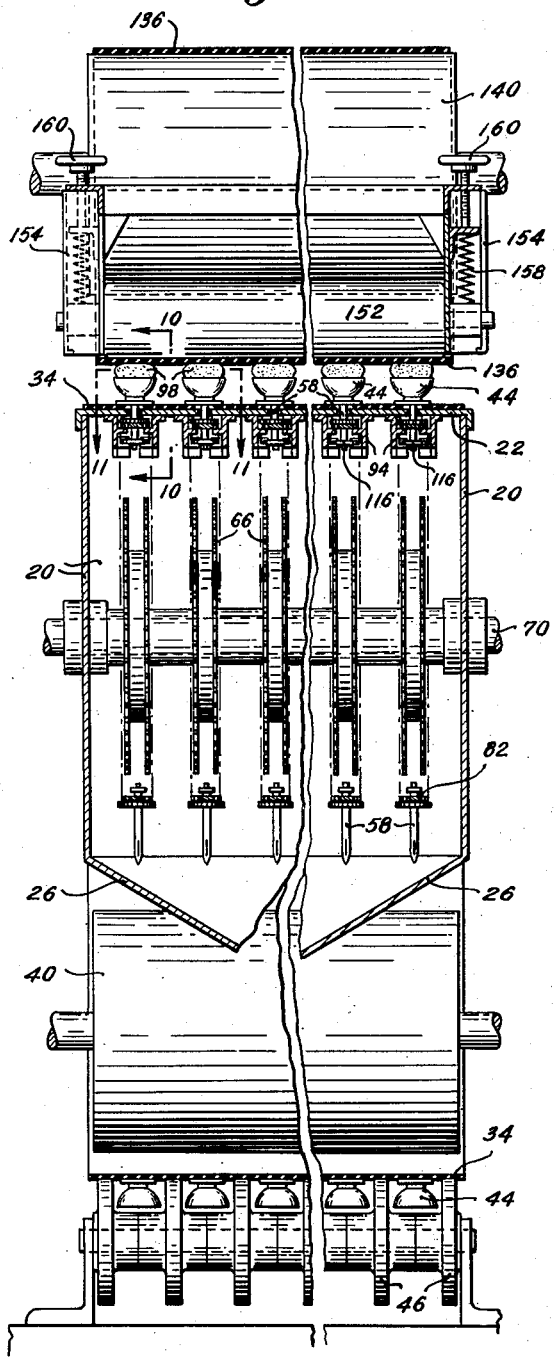
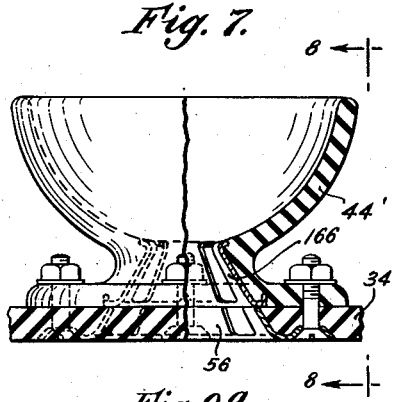
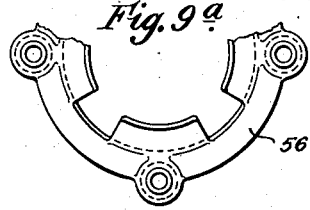
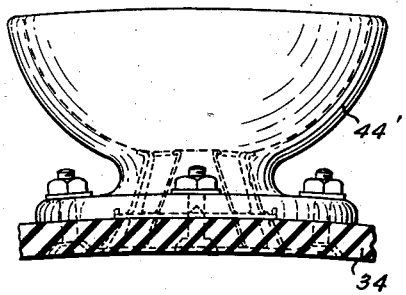
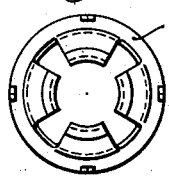
Inventor,
Herman Cohen,
Thomson & Thomson
Attys.

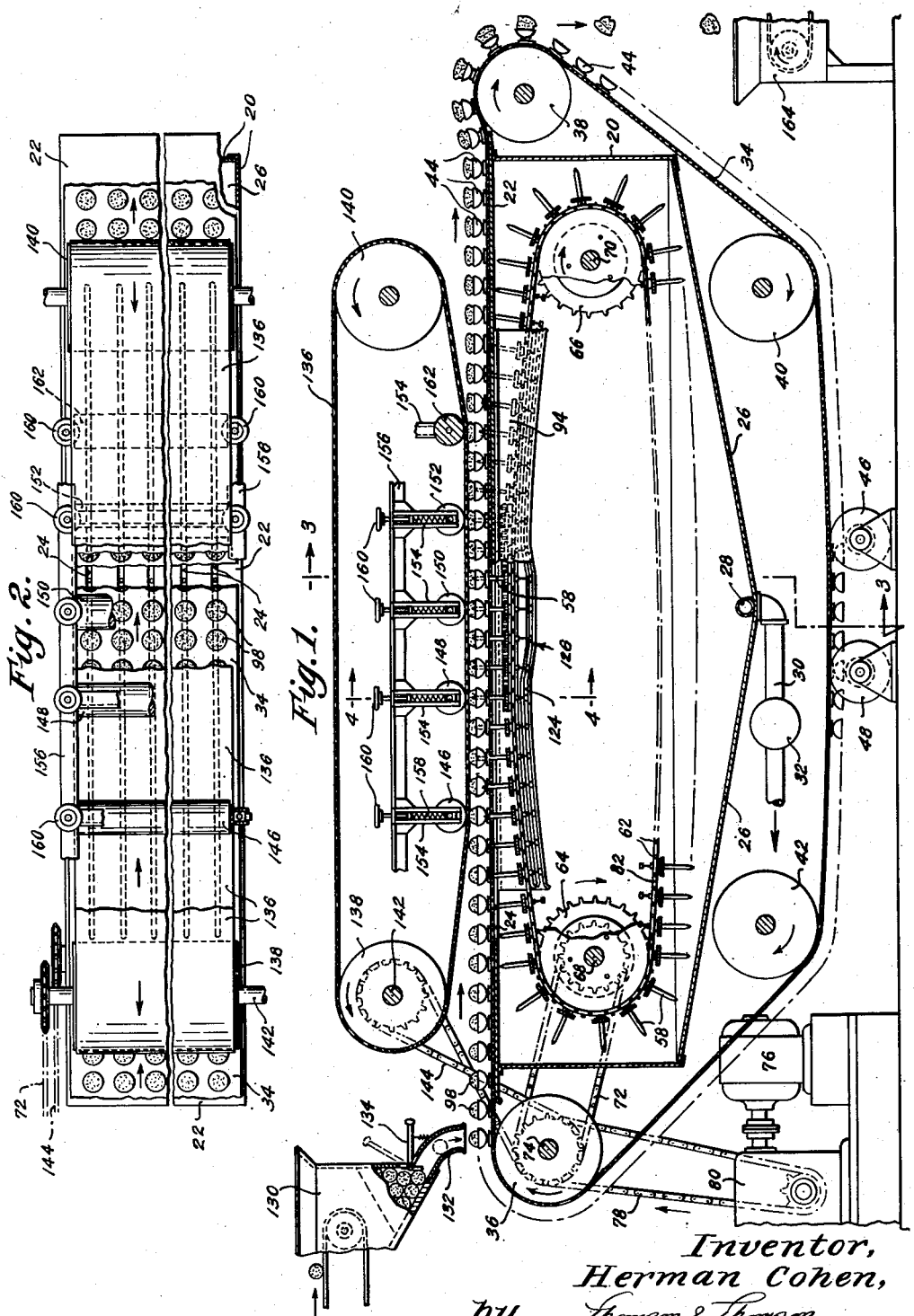

Nov. 20, 1951           H. COHEN           2,575,584
APPARATUS FOR EXTRACTING JUICES FROM CITRUS FRUITS AND THE LIKE
Filed Jan. 7, 1950           5 Sheets-Sheet 3
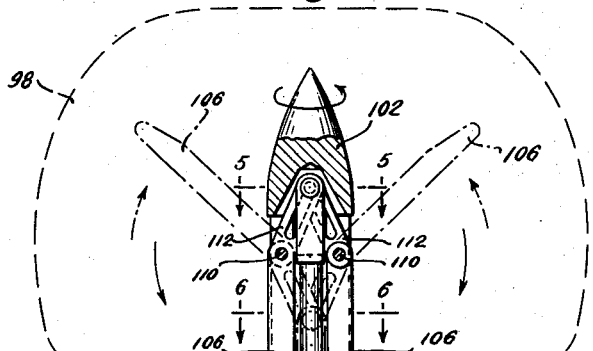
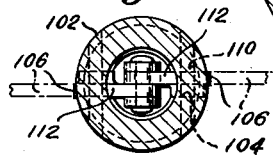
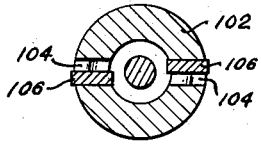
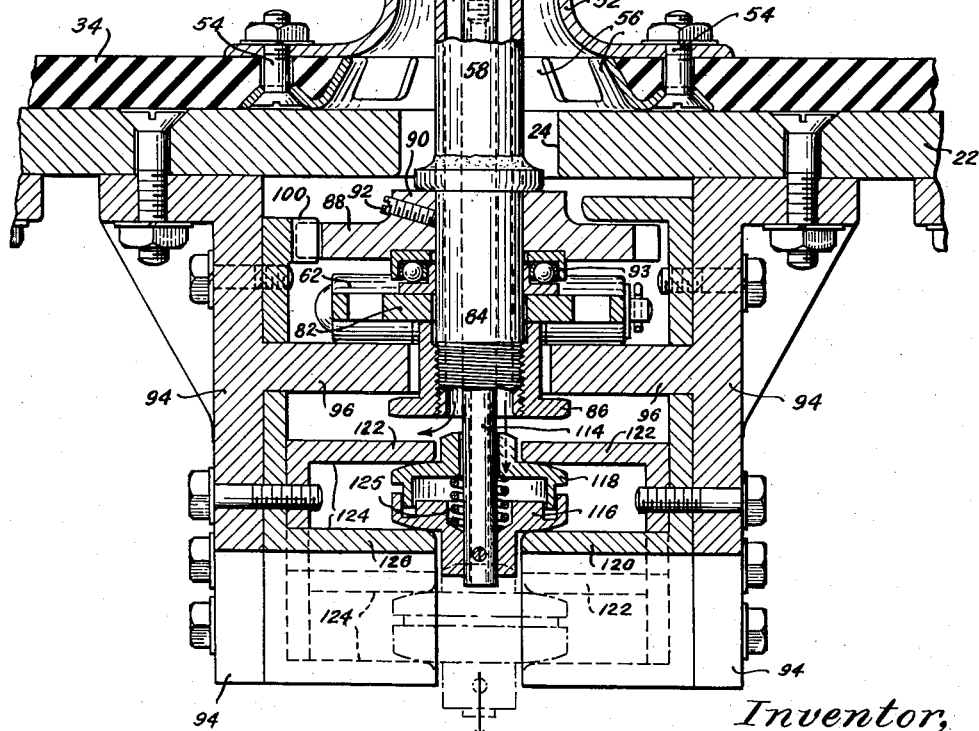
Inventor,
Herman Cohen,
by Thomson & Thomson
Attys.

Nov. 20, 1951  H. COHEN  2,575,584
APPARATUS FOR EXTRACTING JUICES FROM CITRUS FRUITS AND THE LIKE
Filed Jan. 7, 1950  5 Sheets-Sheet 4
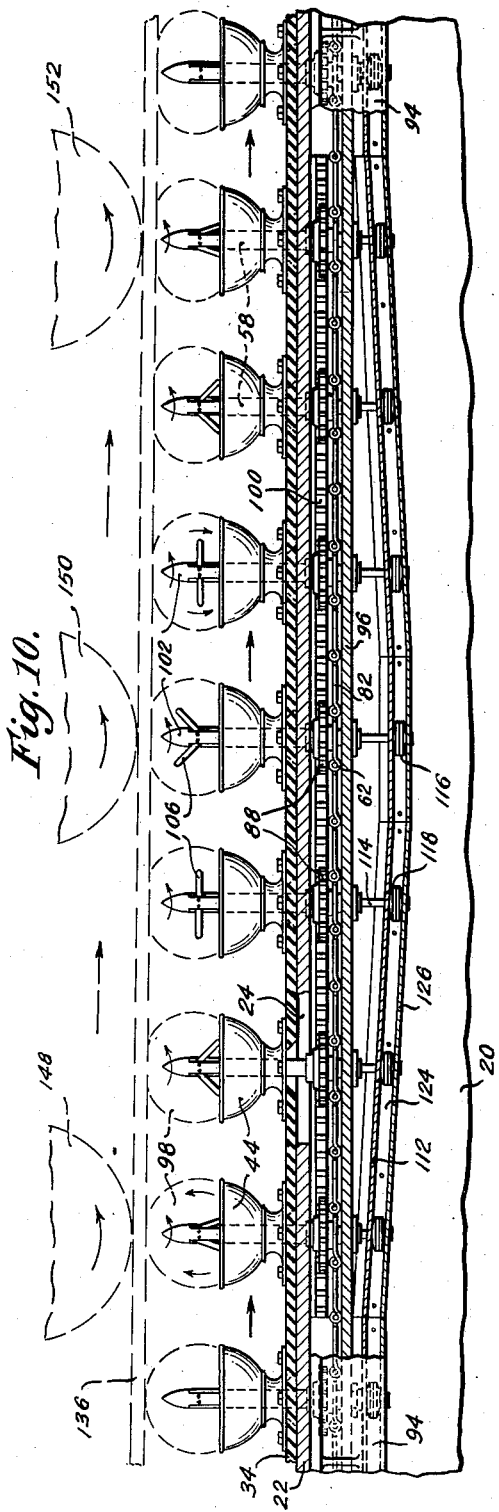
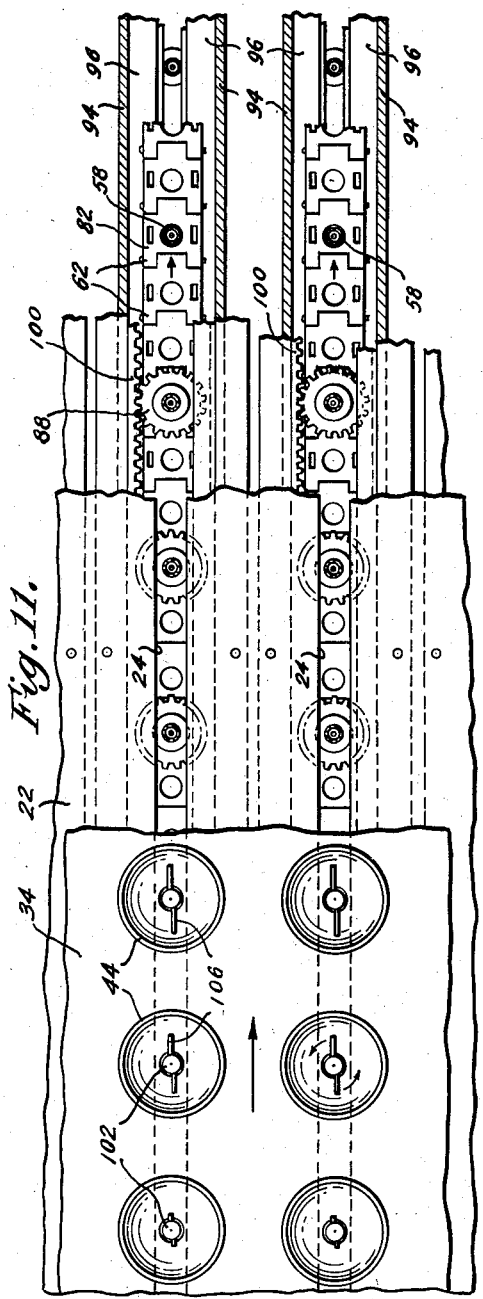
Inventor,
Herman Cohen,
by Thomson & Thomson
Attys.

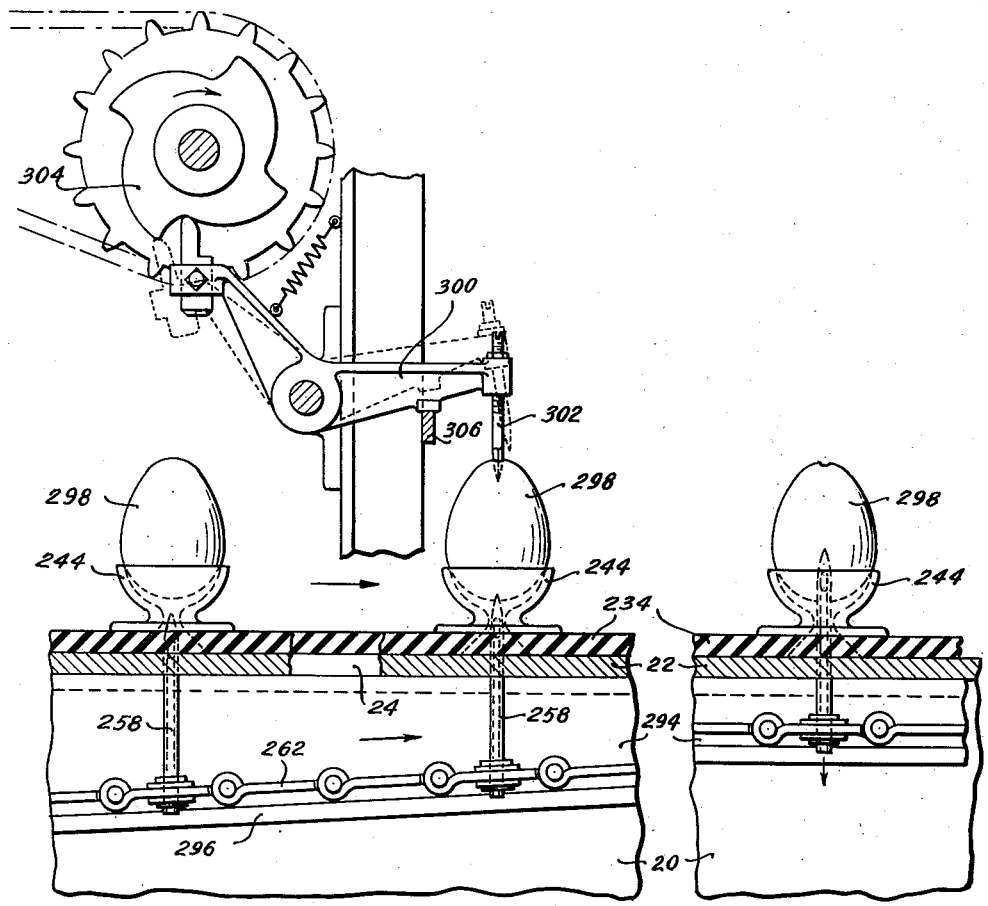

Patented Nov. 20, 1951

2,575,584

UNITED STATES PATENT OFFICE 2,575,584

APPARATUS FOR EXTRACTING JUICES FROM CITRUS FRUITS AND THE LIKE

Herman Cohen, Brookline, Mass.

Application January 7, 1950, Serial No. 137,468

4 Claims. (Cl. 100—35)

This invention relates to a method of and apparatus for extracting juices from citrus fruits and the like, and pertains more particularly to automatic machines for extracting orange juice from ripe oranges.

In the citrus fruit industry, considerable time and effort have been expended in attempts to improve the quality and flavor of the canned juices of oranges, grapefruit or the like, so that the juices will be stable in flavor and free from the bitter oils derived from the skin of the fruit in the usual processing practices. These skin oils cause the canned fruit juices to have a less satisfactory flavor than fresh citrus fruit juices, and it is believed that the skin oils react with the metal of the tinned can to increase the bitter flavor which has heretofore been characteristic of canned fruit juices and fruit juice concentrates.

It is accordingly the purpose of the present invention to provide apparatus for extracting citrus fruit juices, which will eliminate skin oils from the extracted juices, and which will rapidly provide a superior product in substantial quantities at a substantial saving in cost, as compared with the extracting methods now commonly practiced.

A further object of the invention is to provide a machine for continuously conveying fruit-containing cups across the slotted top of a substantially closed tank, and preferably beneath a pressure belt which progressively compresses the fruit during its travel across the tank; the tank being equipped with an air exhausting pump which maintains sub-atmospheric pressure therewithin, and containing a conveyor chain or the like equipped with longitudinally spaced suction tubes arranged to be successively projected through the slots in the top of the tank and into openings in the respective fruit-carrying cups, whereby the juice is extracted from the fruit in the respective cups through said tubes, and drawn by suction into the tank and thence to a suitable reservoir or storage receptacle.

Another object of the invention is to provide means for rotating the suction tubes, and to equip the tubes with automatically movable vanes or wings which cut the webs and segments of the fruit while the juice is being withdrawn, and thus ensure maximum extraction of the fruit juices.

Further novel features of the invention will become apparent from the following description of the recommended embodiment of the improved apparatus illustrated on the accompanying drawings, and will be pointed out in the appended claims. In the drawings, Fig. 1 is a diagrammatic elevational view, partly in section, showing a preferred form of apparatus for automatically and continuously extracting citrus fruit juices, in accordance with this invention;

Fig. 2 is a plan view of the apparatus, partly broken away, and with certain elements of Fig. 1 omitted;

Fig. 3 is an enlarged section on line 3—3 of Fig. 1;

Fig. 4 is an enlarged, fragmentary detail view of one of the fruit cups and its conveyor belt, showing the suction tube and associated mechanism in operative position, as on line 4—4 of Fig. 1;

Fig. 5 is a transverse section on line 5—5 of Fig. 4;

Fig. 6 is a transverse section on line 6—6 of Fig. 4;

Fig. 7 is a detail elevational view, partly in section, of a modified form of fruit cup, composed of rubber or other resilient material, attached to its conveyor belt;

Fig. 8 is a view taken on line 8—8 of Fig. 7, showing the cup in elevation and expanded to facilitate discharge of the dejuiced fruit;

Fig. 9 is a detail plan view of a metal cone or insert forming part of the cup structure shown in Figs. 7 and 8;

Fig. 9a is a fragmentary plan view of a protective metal cone forming part of the conveyor belt element shown in Figs. 7 and 8;

Fig. 10 is an enlarged fragmentary section, in elevation, taken on line 10—10 of Fig. 3;

Fig. 11 is a fragmentary plan view of the apparatus shown in Fig. 10, successively broken away, and taken on line 11—11 of Fig. 3, with the fruit omitted from the cups; and Fig. 12 is a fragmentary sectional view, partly in elevation, of a modified form of mechanism similar to the extracting mechanism illustrated in Fig. 10, but adapted for the extraction of the contents of an egg without shattering the egg shell.

In the juice extracting mechanism shown in Figs. 1 to 11, the machine comprises a tank 20 having a flat top 22 formed with parallel, longitudinal slots 24, and having bottom walls 26 inclining toward an outlet 28 to which is connected a discharge pipe 30 equipped with a vacuum pump 32, the outlet pipe leading to a suitable storage reservoir for the fruit juices drawn from the tank. The pump 32 is of suitable design and construction to ensure a continuous state of partial vacuum within the tank 20, and to draw off the juice sucked from the fruit into the tank as hereinafter explained. A conveyor belt 34, carried by a drive roll 36, a discharge roll 38, and guide rolls 40 and 42, passes longitudinally around the tank with its upper run normally bearing on the tank top 22. The belt thus tends to seal the slots 24 in the tank top, thereby preventing excessive leakage of air into the tank.

The belt 34 carries a plurality of fruit-holding cups 44, suitably attached to the outer surface thereof in spaced longitudinal relation, and preferably in a multiple series of longitudinal rows. The fruit cups 44 may be of metal or plastic material or, as shown in Figs. 7 and 8, of rubber or other resilient material 44'. Additional, peripherally slotted guide rolls 46 and 48 may be provided beneath the lower run or course of the belt 34, as shown in Figs. 1 and 3; the slots of the rolls accommodating the rows of cups.

Each of the cups 44 is provided with a bottom opening 50; and the cup bottoms are preferably mounted upon a tubular member 52 of flexible metal, having a flange fastened to the top of the belt 34 by fastenings 54 (Fig. 4).

The belt 34 is apertured immediately beneath each of the coupling members 52, and each aperture is preferably reinforced by a slotted metal cone 56, held in place by the fastenings 54. The cone 56, the holder coupling 52, and the opening 50 of each cup 44 are in registration and are adapted to receive one of a series of suction tubes 58, when the latter are projected through the slot 24 of the tank top as hereinafter described. The cones 56 protect the belt 34 from being pierced by the tip of the suction tubes and serve to direct the tube toward the cup opening 50 which may be reinforced by a ring 60 applied to the bottom of the cup (Fig. 4).

The suction tubes 58 are spaced longitudinally along a conveyor chain or belt 62 carried by sprockets 64 and 66 mounted at opposite ends of the tank 20 upon shafts 68 and 70 which are suitably journaled in the sides of the tank. The longitudinal spacing of the suction tubes 58 on the conveyor chain 62 corresponds to the spacing of the fruit cups 44 on the belt 34. Sprocket 64 is driven by a chain or belt 72 suitably geared to the shaft 68 and to the shaft 74 of the drive roll or pulley 36, so that chain 62 and belt 34 are driven at the same speed.

A suitable motor 76 drives shaft 74 through a chain or belt 78, suitably geared to said shaft and to a gear or sprocket in a gear box 80 associated with the motor shaft.

A plurality of parallel tube-carrying conveyor chains 62 are preferably provided, to correspond with the number of rows of cups on the belt 34, the rows of chains and rows of cups being in operative relation with each other and with the slots 24 in the tank top. As best shown in Fig. 4, selected links 82 of each chain 62 receive the base 84 of a hollow suction tube 58, said base having a threaded end to which a nut 86 is applied. For the purpose of rotating the tube 64, in accordance with the preferred form of the apparatus, the tube base is provided with a gear 88 disposed between a collar 90 of the tube and an antifriction bearing 93 resting on the chain link 82, the parts being held in assembled relation by the nut 86. The gear 88 may be press-fitted on the tube base and may be additionally secured against rotation by a screw 92, or equivalent means.

In its upper course of travel, each chain passes through a guide frame or bracket 94, suitably fastened to the bottom surface of the tank top 22, and so constructed as to control the vertical position of the conveyor chain and its suction tubes with relation to the tank top, and preferably to cause rotation of the tube. The guide bracket also serves to govern the operation of the movable cutting vanes or wings with which each tube is preferably equipped as hereinafter explained. The sides of the guide bracket for each chain 62 are provided with inwardly directed flanges 96 upon which the chain rides while passing through the bracket. The bracket as a whole slopes upwardly from its ends, as shown in Fig. 1, and the guide flanges 96 are similarly curved so that their ends are at a greater distance from the tank top than their central portions, whereby the chain and the suction tubes connected thereto are gradually elevated to maximum height at the central portion of the bracket, where the tubes project upwardly through the slot 24, through the bottom of the cup 44, and into the orange or other citrus fruit 98 deposited in the respective cups. The guide flanges 96 thence curve downwardly towards the opposite end of the bracket, thereby retracting the suction tubes from the cups (Fig. 1).

The gear 88 engages a rack 100 at one side of the bracket 94, so that the tube is rotated as it passes through the bracket. The rack 100 follows the contour of the guides 96.

Each suction tube 58 is preferably provided with a removable, solid tip member 102 having a pointed end and having slots 104 in its opposite sides, each of said slots receiving one of a pair of wings 106 so connected to a vertically movable stem or rod 108 that the wings are extended laterally when the rod is moved downward. The slots 104 also provide entrance ports to the hollow tube part 58. The wings 106 are pivoted to the tube tip 102 at 110, and carry slotted, actuating arms 112 respectively hinged to the upper end of a vertically movable stem 108, to effect the outward swinging movement of the cutting wings when the stem is moved downwardly.

Movement of the stem or rod 108 is controlled by other guide members in the guide bracket or frame 94, the bottom portion 114 of the stem being connected to the lower element 116 of a spring pressed collar or shoe having a co-operating upper member 118, said collar elements riding between base flanges 120 of bracket 94 and co-operating flanges 122 bolted to the sides of the bracket 94 to provide a guide channel 124 for the composite shoe 116—118, as shown in Fig. 4. The coiled spring 125 between the collar elements serves to maintain resilient tension of the guide shoe against the opposite walls of said channel.

The channel 124 follows the slope of the guide flanges 96 at the opposite ends of the guide bracket 94, so that the movable stem 108—114 is maintained in normally elevated position with respect to the suction tube, thereby holding the wings 106 in retracted position as shown in full lines in Fig. 4, during the travel of the conveyor chain 62 in those end portions of the guide bracket. The channel 124 slopes downwardly at 126 in the central portion of the bracket, as shown in full lines in Fig. 1 and in broken lines in Fig. 4, thereby moving the stem 108, 114 downwardly within the suction tube and causing the wings 106 to be swung outwardly to the broken line position of Fig. 4. The channel 124 then slopes upwardly again (toward the right of Fig. 1), to elevate the reciprocating stem and restore the wings 106 to normal, inoperative position.

Said stem rotates with the suction tube, the parts being suitably interconnected against relative rotation as by the pivots 110 for the wings 106. Hence, when the cutting wings are swung outwardly they are rotated within the fruit 98, to break the pulp and fruit segments of the orange, and thus assist in freeing the fruit juices for extraction by suction. The extreme upper end of the tube tip 102 is pointed so that it readily pierces the skin or rind of the fruit when it is projected upwardly through the bottom of the cup 44.

The oranges or other citrus fruit may be deposited in the cups 44 from a hopper 130 having discharge spouts 132 disposed immediately above the path of travel of the respective rows of cups. A manually or mechanically operated handle 134 may be provided to control the dropping of the fruit through the spouts, the structural details of the depositing mechanism being immaterial to the present invention.

In order to hold the fruit in the cups 44 while they are being pierced, as aforesaid, by the tips of the suction tubes, and to exert squeezing pressure thereon, a continuous pressure belt 136 is supported above the rows of cups on a driven roller 138 and a guide roller 140. Roller 138 has a shaft 142 driven through a sprocket or gear from the main drive shaft 74, by a chain or belt 144. The lower course of the belt 136 is held in resilient, pressing engagement with the tops of the deposited fruit, by providing a series of transverse pressure rollers 146, 148, 150 and 152, the axles of which are journaled in brackets 154 suitably fixed to a stationary rail 156. The brackets 154 include springs 158 which resiliently press said axles downwardly to tension the lower course of the belt 136 against the oranges, the vertical position of said rollers and the degree of tension thereon being manually adjustable by screws 160. Said screws are so regulated that the rollers 146—152 exert progressively increasing pressure on the belt 136, so that the fruit in the cups 44 is progressively compressed while being pierced by and receiving the suction tubes, to squeeze the juice therefrom and permit it to be sucked downwardly through the tubes 58, the flow of juice being indicated by the arrows in Fig. 4. In the intermediate stage of such progressive compression, the cutting wings 106 are automatically opened and rotated by the mechanism above described.

Maximum compression of the fruit thus occurs beneath the pressure roller 152 shortly after the rotating wings have been closed and just prior to the retraction of the suction tubes from the cups 44. An auxiliary guide roller 162 may be provided to hold the belt on the compressed rinds in the cups during final retraction of said tubes. As the belt 34 passes over the end roller 38, the exhausted rinds of the fruit drop from the cups 44 and may be collected in a receiver 164, whence they may be conveyed to another machine for further processing into by-products.

The discharge of the rinds is facilitated by making the cups of rubber or other resilient material as indicated at 44' in Figs. 7 and 8, whereby the cups are expanded as the belt 34 is curved in passing over roller 38 (Fig. 8). The opening in the bottom of the cups 44' may be reinforced by a slotted cone 166 as indicated in Figs. 7 and 9, the cone serving to guide the point of the tube tip 102 through the bottom opening of the cup.

It will be apparent from the foregoing that the juice extracting machine operates automatically to move the rows of fruit cups on the belt 34 over the top of the tank 20, while the rows of suction tubes mounted on the conveyor chains 62 are moving, in synchronism, within the tank, each conveyor chain passing through the guide bracket or housing 94, so that the tips of the tubes are gradually elevated through the slots 24 of the tank top and thence through the openings in the belt and into the apertured bottoms of the cups 44, to pierce the fruit deposited therein. After the tubes have been projected into the fruit, while the latter are yieldingly pressed into the cups by the pressure belt 136, the cutting wings 106 are extended or opened by movement of stem 108, and caused to rotate by the rack and gear mechanism which rotates the tubes, to cut the pulp of the fruit, and permit the fruit juice to be sucked downwardly through the tubes 58 into the tank 20 by the partial vacuum maintained therein. The juice passes downwardly through the suction tubes and through the guide mechanism, and collects in the bottom of the tank, whence it is pumped to a suitable storage reservoir through the outlets 28, 30, after which the juice may be canned in accordance with conventional practices. Inasmuch as the juice is sucked downwardly through the tube penetrating the interior of the fruit, none of the bitter oils of the skin or rind will be present in the extracted juice.

In the modification shown in Fig. 12, designed for the extraction of the fluids of an egg, the belt 234 (corresponding to the belt 34) is equipped with cups shaped to receive an egg deposited therein by hand or otherwise, and said belt 234 travels over the slotted tank top 22, as aforesaid. Suction tubes 258 (corresponding to the tubes 58 but omitting rotational mechanism and the cutting wings 106) are carried by a conveyor chain 262 (similar to the chain 62) through a guide bracket 294 (corresponding to the bracket 94) but having only one set of guide flanges 296 for elevating the tubes to pierce the bottom of the egg shell.

The compression belt 136 of Figs. 1–11 is omitted in this modification, and other mechanism is provided for piercing the top of the eggs 298, at the moment the tips of the suction tubes 258 penetrate the bottom thereof. Such mechanism may comprise a pivoted crank arm 300 carrying a piercing implement 302, and actuated against spring resistance by a cam 304, in synchronism with the movement of the belt 234 and chain 262. A stop bar 306 limits downward movement of the piercing pin 302. The cam 304 may be so designed as to operate the arm and piercing pin with a quick, snap action, so that continuous movement of the eggs carried by the cups 244 on the belt 234, is not impeded.

After the suction tube has penetrated the pierced egg, as shown at the right of Fig. 12, the suction within the tank 20 extracts the fluid from the egg shell, and the tube 258 is retracted as aforesaid. The empty shells drop from the cups 244, as the belt 234 travels over the roller at the discharge end of the machine. It is thus apparent that the apparatus herein disclosed may be adapted for extracting fluids or juices from eggs, as well as from citrus fruits or the like; and it is intended that the appended claims will cover any uses for which the method or apparatus of this invention may be adapted.

I claim:

1. Apparatus for extracting juice from citrus fruits and the like, comprising a tank having a slotted top, a pump for partially exhausting air from the tank, a conveyor movable longitudinally within the tank beneath a slot in the top thereof, suction tubes spaced longitudinally along said conveyor and adapted intermittently to be projected through said slot, a conveyor belt movable longitudinally around the tank and over the slotted surface of the tank top, cups spaced longitudinally along the outer surface of said conveyor belt and adapted to receive and transport fruit deposited therein, the spacing of the cups being substantially the same as the spacing of said tubes, the bottom of said cups and said belt having registering openings positioned over said slot in the tank during movement of said conveyor belt and cups over the slotted surface of the tank top, guide means mounted in the tank beneath said top of the tank and engaging said conveyor, whereby a portion of the moving conveyor is gradually elevated to project the suction tubes thereon successively through said slot in the tank, through the respective belt and cup openings, and into the fruit within the respective cups moving in succession, and then to withdraw the tubes successively into the tank, and means for driving said conveyor and conveyor belt in synchronism.

2. Apparatus as described in claim 1, having a pressure belt movable in spaced relation to said conveyor belt and adapted to engage the tops of the fruit in the respective cups while said fruit is penetrated by said tubes, and resilient means for gradually increasing the pressure exerted by said pressure belt on the fruit in successive cups.

3. Apparatus as described in claim 1, having means associated with said guide means and tubes for rotating said tubes, the tubes having hinged wings at the upper ends thereof, means including a stem within each tube for extending and retracting said wings, and means associated with said guide means and said stem for raising and lowering the stem to actuate said wings while the upper ends of the respective tubes are projected into the respective fruits.

4. Apparatus as described in claim 1, having means associated with said guide means and tubes for rotating said tubes, the tubes having hinged wings at the upper ends thereof, means including a stem within each tube for extending and retracting said wings, means associated with said guide means and said stem for raising and lowering the stem to actuate said wings while the upper ends of the respective tubes are projected into the respective fruits, a pressure belt movable in spaced relation to said conveyor belt and adapted to engage the tops of the fruit in the respective cups while said fruit is penetrated by said tubes, and resilient means for gradually increasing the pressure exerted by said pressure belt on the fruit in successive cups.

HERMAN COHEN.

REFERENCES CITED

The following references are of record in the file of this patent:

UNITED STATES PATENTS

| Number | Name | Date |
|---|---|---|
| 2,353,841 | McKinnis | July 18, 1944 |
| 2,445,490 | Meade | July 20, 1948 |
| 2,446,812 | Cribb | Aug. 10, 1948 |
| 2,475,559 | Wilson | July 5, 1949 |
| 2,511,374 | Rahrer | June 13, 1950 |